Figure 1:
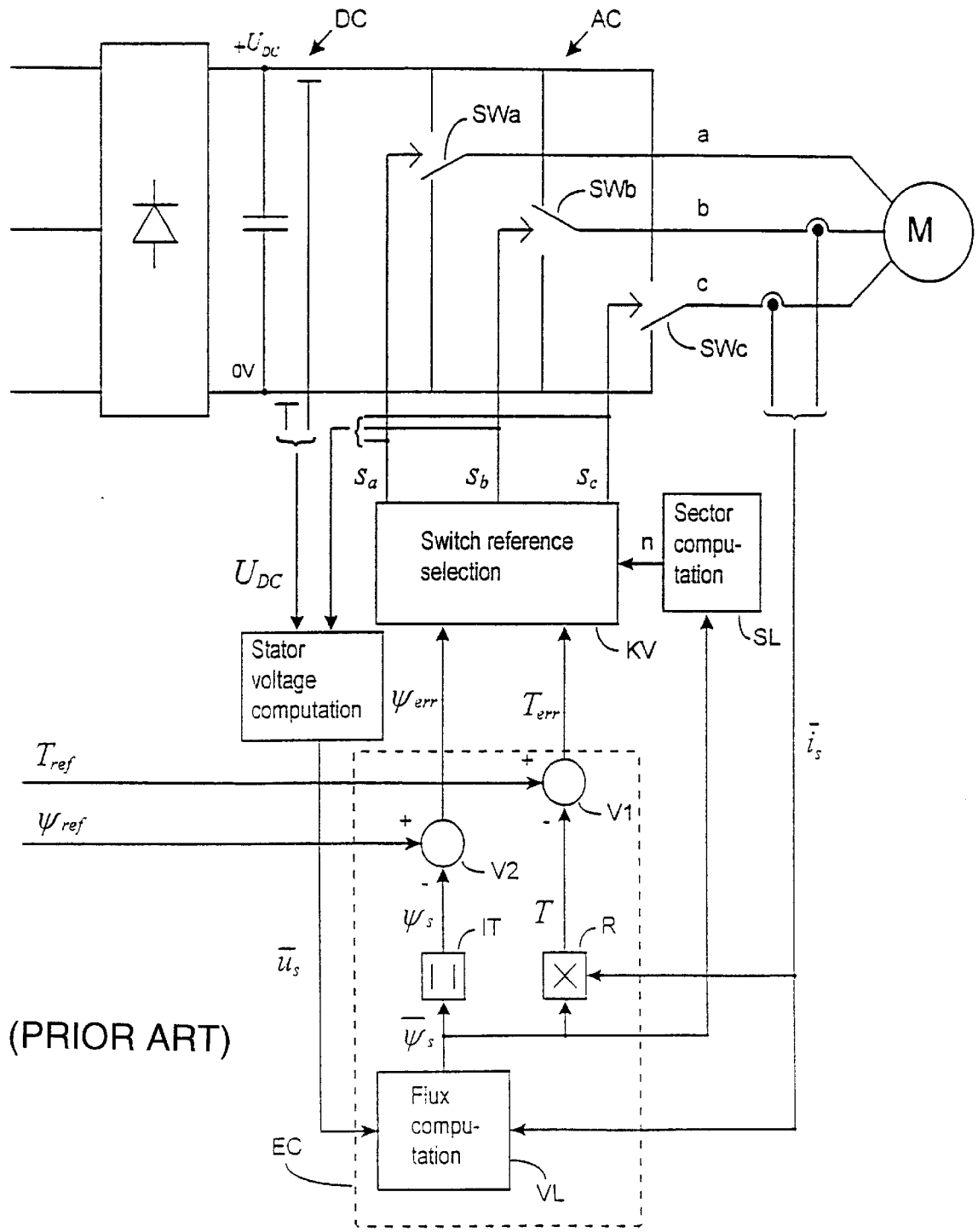

United States Patent [19]
Heikkilä

[11] Patent Number: 6,094,364
[45] Date of Patent: Jul. 25, 2000

[54] DIRECT TORQUE CONTROL INVERTER ARRANGEMENT

[75] Inventor: Samuli Heikkilä, Helsinki, Finland

[73] Assignee: ABB Industry Oy, Helsinki, Finland

[21] Appl. No.: 09/117,739

[22] PCT Filed: Feb. 12, 1997

[86] PCT No.: PCT/FI97/00090

§ 371 Date: Aug. 5, 1998

§ 102(e) Date: Aug. 5, 1998

[87] PCT Pub. No.: WO97/30510

PCT Pub. Date: Aug. 21, 1997

[30] Foreign Application Priority Data

Feb. 13, 1996 [FI] Finland ................................. 960650

[51] Int. Cl.[7] ................................................. H02M 1/14
[52] U.S. Cl. ........................... 363/41; 363/37; 318/807
[58] Field of Search ................................ 363/37, 40, 41, 363/97, 98, 131, 132; 318/434, 806, 807, 809

[56] References Cited

U.S. PATENT DOCUMENTS 5,107,438  4/1992  Sato ..................................... 363/41 X
5,541,488  7/1996  Bansal et al. ........................ 318/807 X

FOREIGN PATENT DOCUMENTS

0439642A1  8/1991  European Pat. Off. .

OTHER PUBLICATIONS

"A New Quick–Response and High–Efficiency Control Strategy of an Induction Motor", Isao Takahashi and Toshihiko Moguchi, Transactions on Industry Application, (no month) 1986.

"Principles and Implementation of Direct Torque Control" by Stator Flux Orientation of an Induction Motor, Y.S. Chapuis, D. Roye and J. Davoine, Mar., 1995.

"Direct Torque Control of AC Motor Drives", Mika Aaltonen, Pekka Tiltinen, Jarkko Lalu, and Samuli Heikkila, Mar. 1995.

*Primary Examiner*—Y. J. Han
*Attorney, Agent, or Firm*—Watson Cole Grindle Watson P.L.L.C.

[57] ABSTRACT

The invention relates to an inverter arrangement for simultaneous control of a stator flux and a torque of an electric machine (M). In the invention, the inverter of the inverter arrangement is controlled on the basis of a stator voltage reference ($u_{sref}$) defined on the basis of the error variables ($T_{err}$, $\Psi_{err}$) of the torque and the stator flux; on the basis of the stator voltage reference, in turn, are defined reference values for the phase voltages ($u_{aref}$, $u_{bref}$, $u_{cref}$) of the stator voltage. The phase voltages ($u_a$, $u_b$, $u_c$) of the stator voltage supplied to the electric machine (M) are controlled by a feedback voltage controller (VAC) to correspond to the defined reference values ($u_{aref}$, $u_{bref}$, $u_{cref}$) of the phase voltages.

9 Claims, 6 Drawing Sheets

DIRECT TORQUE CONTROL INVERTER ARRANGEMENT

The invention relates to an inverter arrangement for simultaneous control of a stator flux and a torque of an electric machine, the arrangement comprising an inverter connected to a direct voltage intermediate circuit for generating an alternating voltage that has the same number of phases as the electric machine and a control system for controlling an instantaneous value of the alternating voltage generated by the inverter; the control system receiving, as input variables, reference values for the torque and stator flux and measured values for the stator current and stator voltage or for variables comparable to them, and comprising means for defining, for the torque and the stator flux, error variables that are based on input variables and describe the difference between the reference values and actual values, and means for controlling the switches of the inverter on the basis of these error variables.

The basic idea of a conventional DTC inverter (DTC= Direct Torque Control) of the type described above is that the stator flux and torque of an electric machine are controlled simultaneously such that the instantaneous voltage supplied to the machine corresponds as closely as possible to the instantaneous need of controlling the flux and torque. A block diagram of such a conventional DTC inverter is shown in FIG. 1 of the accompanying drawings and is also previously known, for example, from the article 'A New Quick-Response and High-Efficiency Control Strategy of an Induction Motor' by Takahashi and Noguchi in *IEEE Transactions on Industry Applications*, Vol. IA-22, No. 5, September/October 1986.

The actual values of the flux and torque needed in the control are usually computed on the basis of the voltage and current supplied to the machine. Normally, a stator voltage vector $\overline{u}_s$ is computed from a direct voltage $U_{DC}$ measured in a direct voltage intermediate circuit DC and from positions $S_a$, $S_b$ and $S_c$ of switches SWa, SWb and SWc used in an inverter AC, whereas a current vector $\overline{i}_s$ is obtained on the basis of two measured phase currents.

The stator voltage and current are input variables for a flux computing block VL in which a stator flux vector $\Psi_s$ is computed on the basis of the basic equations of the machine. Computation of a vector product of the stator flux and current in block R gives an instantaneous torque T. When the so obtained actual value of the torque is subtracted from the reference value $T_{ref}$ of the torque in block V1, an error variable $T_{err}$ is obtained for controlling the torque. Correspondingly, when an absolute value $\Psi_s$ computed in block IT for the actual value of the flux is subtracted from a reference value $\Psi_{ref}$ of the stator flux in block V2, an error variable $\Psi_{err}$ is obtained for controlling the torque. When the difference value is positive, control measures should be taken to increase the actual value, and vice versa. The means associated with the computation of the error variables are indicated in FIG. 1 by a common reference EC.

A DTC inverter also needs to know in which sector (in which sixth of a circle) a stator flux vector is located at a given moment. The sector number n (=0 . . . 5) is determined in a separate sector computation block SL, to which the stator flux vector is thus inputted.

The sector number n and the error variables $\Psi_{err}$ and $T_{err}$ of the flux and torque controls are input variables for a switch reference selection block KV, the function of which is to select the switch position (i.e. voltage vector) that maintains the actual values of the torque and flux within certain hysteresis limits. A zero vector and six voltage vectors that appear from FIG. 2 of the accompanying drawings are available; from these is selected the vector that best suits the instantaneous control situation. The essential feature is then the phase angle of the voltage $\overline{u}_s$ in relation to the flux $\Psi_s$. This is illustrated in FIG. 3 of the accompanying drawings. If the torque is to grow ($T_{err}>0$), a voltage vector is selected whose component $u_q$ perpendicular to the flux is as great as possible. If, on the other hand, the is stator flux is to grow ($\Psi_{err}>0$), a voltage vector is selected whose component $u_d$ parallel to the flux is as great as possible. Correspondingly, when the flux or torque is reduced, the above components must be negative. If there is no need for control, a zero vector is selected.

The basic problem of a DTC inverter is that each turn of the switch needs as close to real time data as possible about the flux and the torque. From this it follows that the switches can be turned only when new flux and torque estimates have been received. This leads to a need to use a rapid signal processor in the computation of the actual values of the motor, in order that the average switching frequency would be sufficiently high. The minimum pulse width is thus dependent on the flux and torque control cycle, which even at best is dozens of micro seconds. Each voltage vector is valid for at least the duration of the control cycle concerned, i.e. all control measures taken are major control measures.

The problem of control is made even worse by the fact that there are only six voltage vectors that deviate from zero. Usually it is not possible to select a vector that would affect both the torque and the amplitude of the flux in exactly the desired manner.

The advantage of a DTC inverter is a rapid torque increase rate, which in practice is determined by the stray inductance of the machine. In some motors with a low stray inductance the torque may rise by up to 50% from the nominal torque during a single control cycle, which in turn causes a notable torque ripple and noise problem. If the torque response is too steep, it can no longer be considered an advantage. In practice, a 5 ms response time would be sufficient.

The object of the present invention is to provide an inverter arrangement by which the above problems of a conventional DTC inverter can be eliminated at least in essence. The object is achieved by an inverter arrangement according to the invention, a first embodiment of the arrangement being characterized in that the means for controlling the switches of the inverter comprise means for generating a stator voltage reference based on the error variables of the torque and stator flux, means for generating reference values on the basis of the stator voltage reference defined for the phase voltages of the stator voltage and the reference value that has been given to the common-mode voltage of the stator voltage, and a feedback voltage controller for controlling the phase voltages of the stator voltage supplied to the electric machine such that they correspond to the defined reference values of the phase voltages.

An alternative to the phase-specific control of the stator voltage used in the first embodiment is that the main voltages of the stator voltage are controlled, the second embodiment of an inverter arrangement according to the invention being characterized in that the means for controlling the switches of the inverter comprise means for generating a stator voltage reference on the basis of the error variables of the torque and stator flux, means for generating reference values on the basis of the stator voltage reference defined for the main voltages of the stator voltage and a feedback voltage controller for controlling the main voltages of the stator voltage supplied to the electric machine such that they correspond to the defined reference values of the main voltages.

Figure 2:
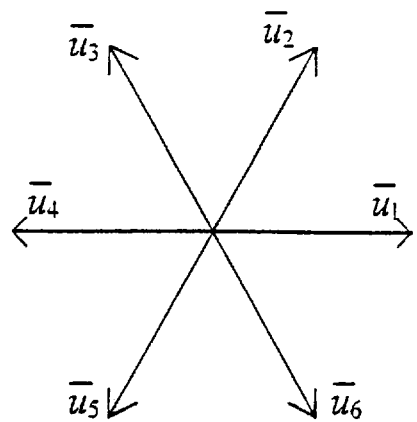
Figure 3:
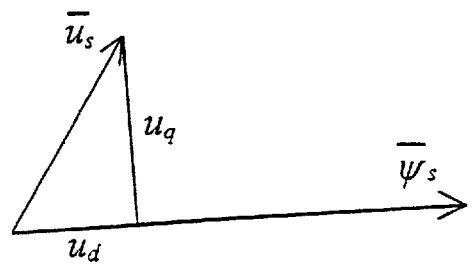

The problems of a conventional DTC inverter are avoided in an inverter arrangement according to the invention, since more voltage vectors are now available than were shown in FIG. 2 and so there is no need to compute each turn of the switch. This has been achieved by dividing the control into two so that the torque control computes phase or main voltage references for a separate voltage controller rather than the positions of the switches, the function of the controller being to control the phase and main voltages of the machine to be equal to the voltage references given.

Preferably, the means for generating a stator voltage reference contained in torque control comprise a flux controller for generating, on the basis of the error variable of the stator flux, a component of the stator voltage reference that is parallel to the stator flux; a torque controller for generating, on the basis of the error variable of the torque, a component of the stator voltage reference that is perpendicular to the stator flux; and means for performing coordinate system conversion in order to convert the stator voltage reference defined by its components in a stator flux coordinate system into a stator voltage reference in a stator coordinate system.

Since a voltage controller is used in an inverter arrangement according to the invention for setting the output voltage of the inverter, the defined stator voltage reference can be used as one of the input variables to the means for defining the error variables for the torque and stator flux instead of having to measure the stator voltage separately for the purpose. This is based on the fact that the voltage controller can be considered to be able to operate with such accuracy that the target voltage given to it as a reference is achieved with sufficient accuracy and that the target voltage instead of the actual measured value can be used in the control.

If one aims at phase-specific voltage control, it is possible to use a feedback voltage controller, which comprises a pulse width modulator provided with an LC low pass filter and with voltage feedback, and an oscillator circuit for generating a control voltage that controls the switching frequency of the switches in the inverter, the pulse width modulator being arranged to receive both the measured values of the phase voltages of the stator voltage and the reference values of these voltages as well as the control voltage generated by the oscillator circuit, and to generate control signals for the switches of the inverter on the basis of these voltages.

When it is the main voltages that are controlled, it is possible to use a feedback voltage controller comprising an LC low pass filter the capacitors of which are connected between the phase voltages, means for forming the actual values of the main voltages from the phase voltages, and a modulator that is arranged to receive both the actual values of the main voltages of the stator voltage and their reference values and to generate control signals for the switches of the inverter on the basis of the voltages.

Alternatively, when main voltage control is used, it is possible to use a feedback voltage controller comprising an LC low pass filter the capacitors of which are connected to a common star point, which in turn is connected through a capacitor to the minus pole of a direct voltage intermediate circuit, means for forming the actual values of the main voltages from the phase voltages, and a modulator that is arranged to receive both the actual values of the main voltages of the stator voltage and their reference values and to generate control signals for the switches of the inverter on the basis of the voltages. In this solution the voltage controller is provided with a common-mode voltage filtering system.

Figure 6:
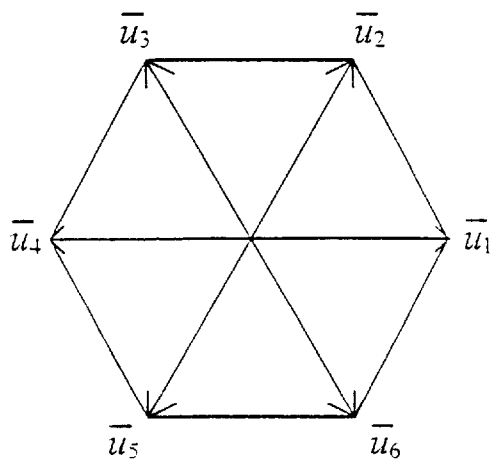
Figure 4:
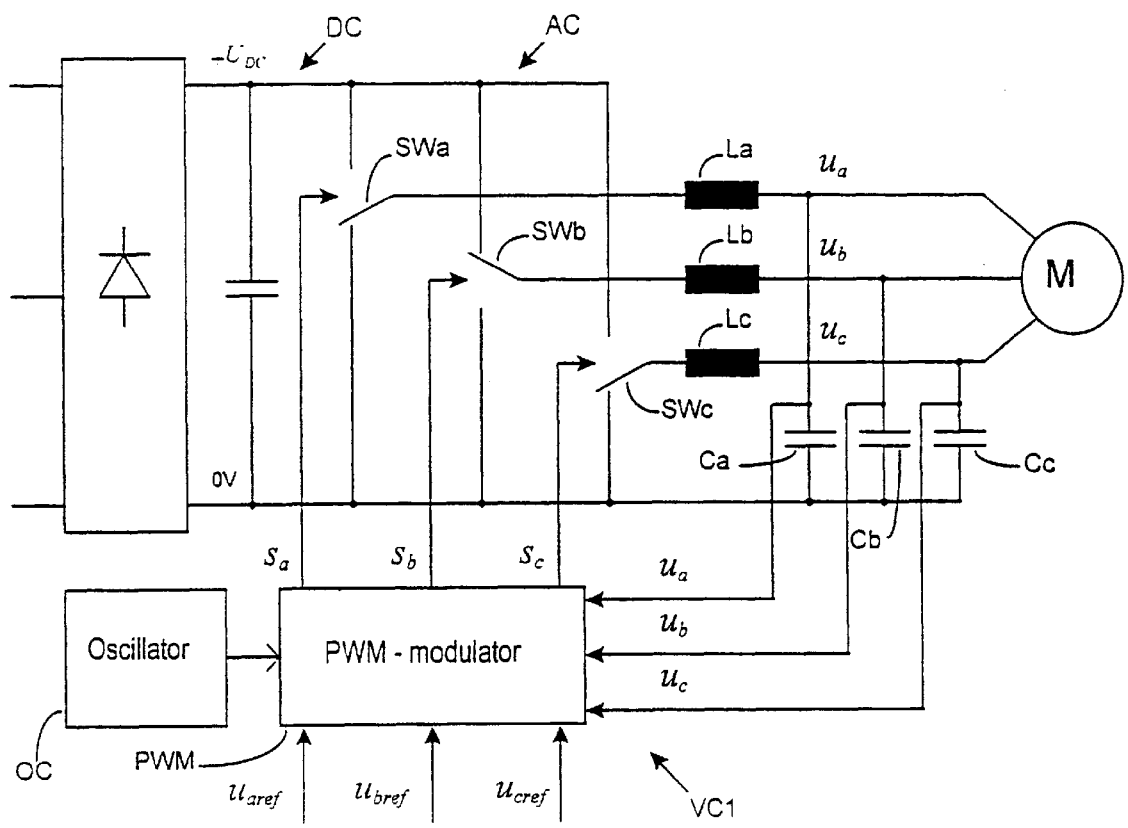
Figure 5:
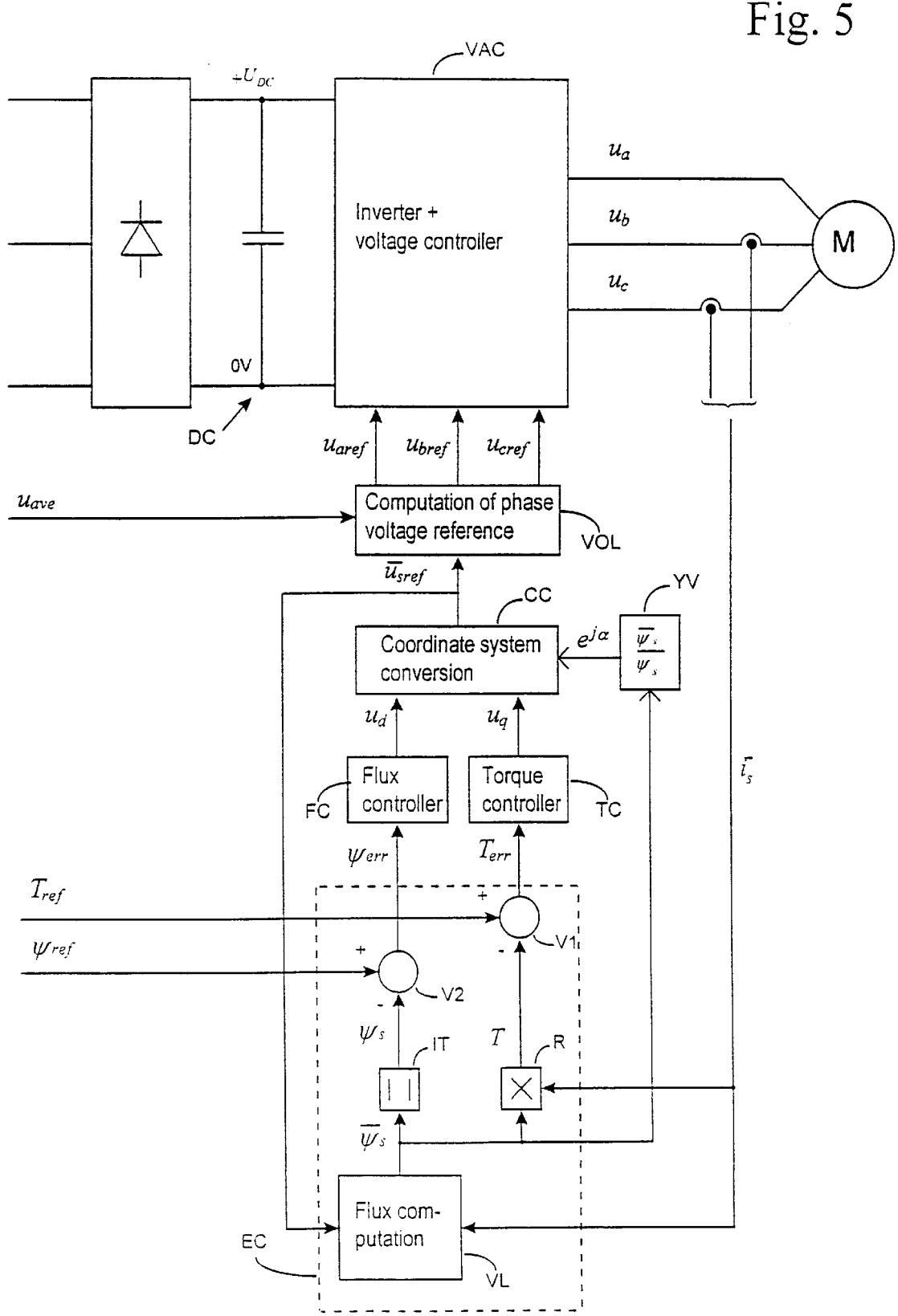
Figure 7:
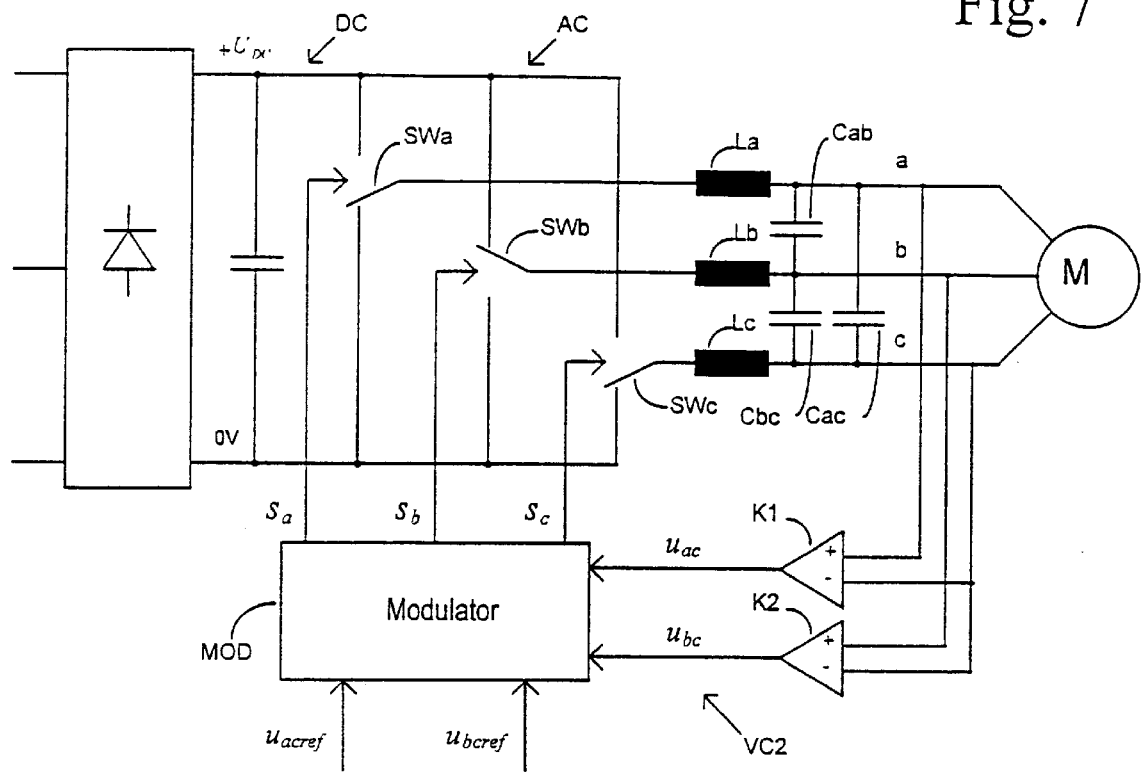
Figure 8:
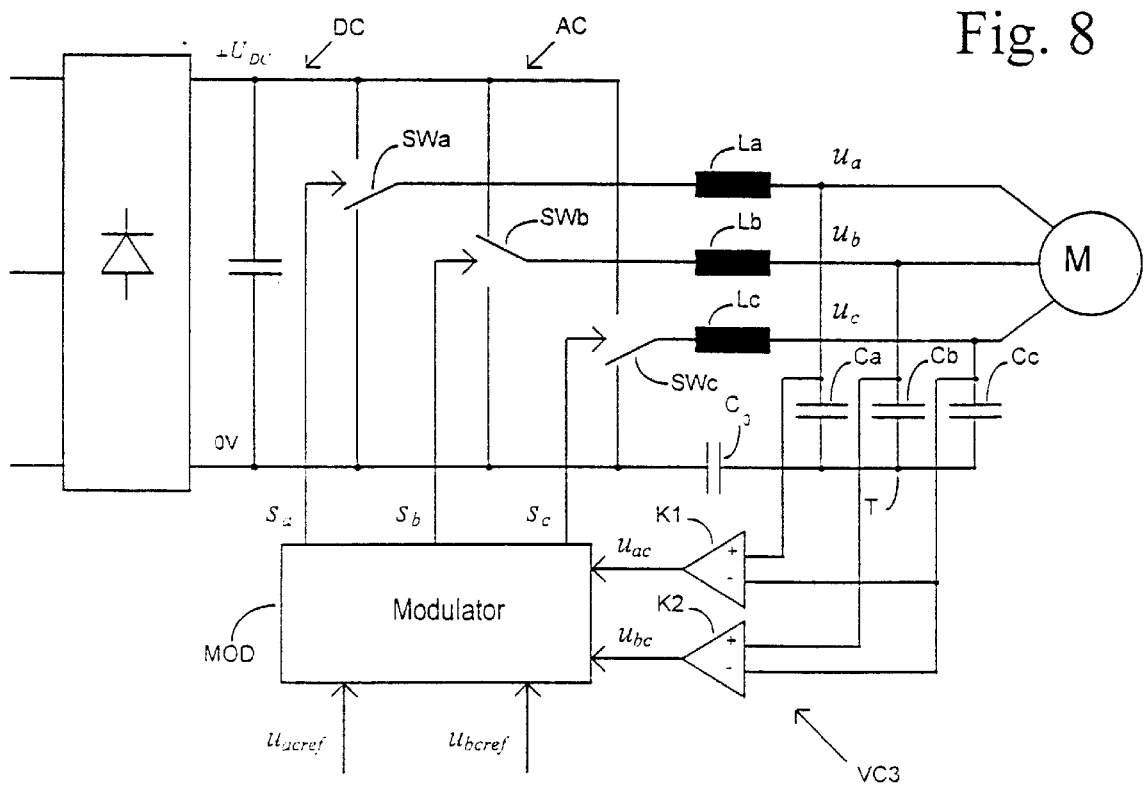
Figure 9:
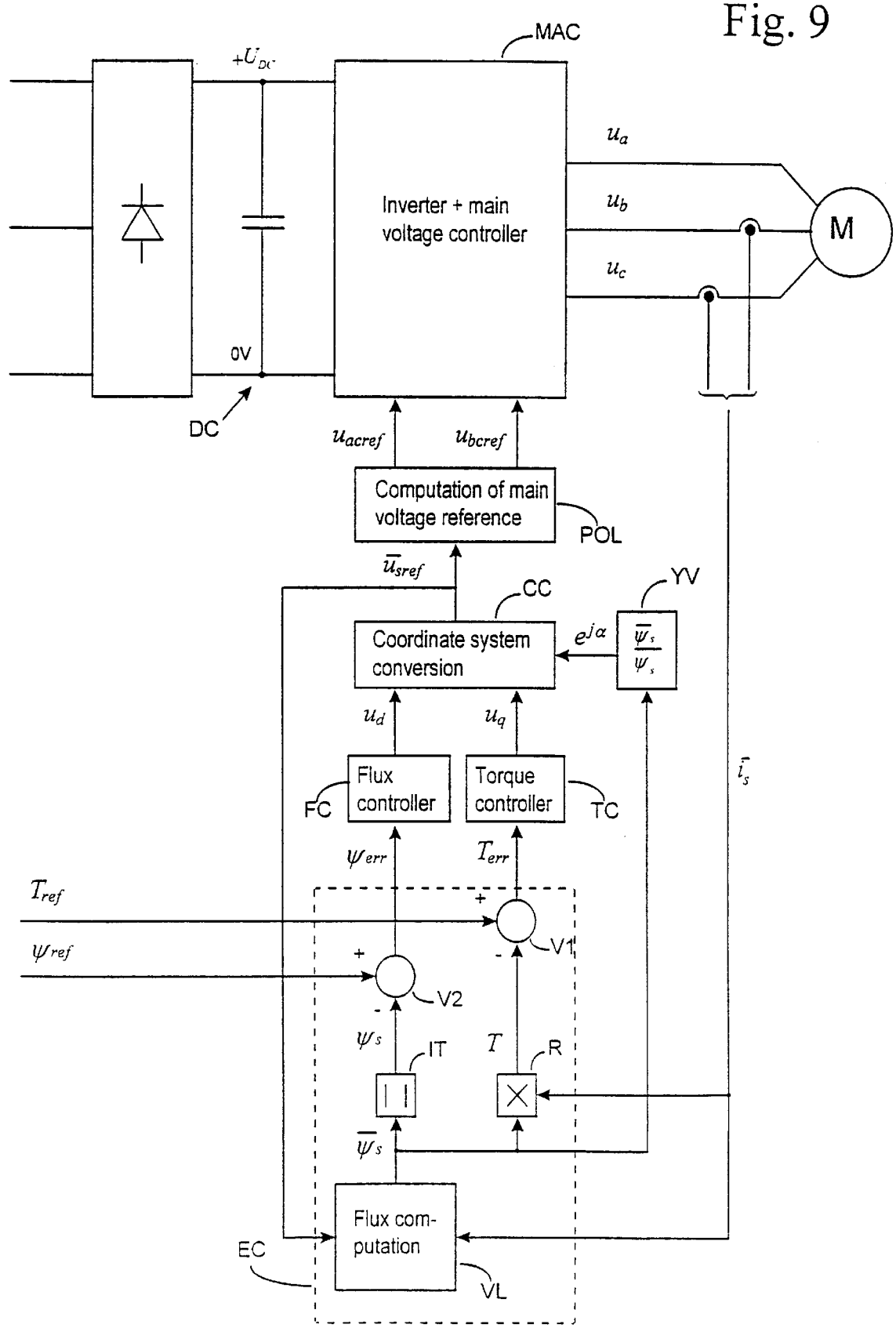

In the following the inverter system according to the invention will be described in greater detail with reference to the attached drawing, in which FIG. 1 is a block diagram illustrating a conventional DTC inverter, FIG. 2 shows the voltage vectors of a 2-level inverter in conventional DTC control, FIG. 3 shows the components of the stator voltage in respect of the stator flux, FIG. 4 is a block diagram illustrating a voltage controller suitable for use in a first embodiment of an inverter arrangement provided by the invention, FIG. 5 is a block diagram illustrating the first embodiment of an inverter arrangement provided by the invention, FIG. 6 shows the voltage vectors available in an inverter arrangement provided by the invention, FIG. 7 is a block diagram illustrating a first embodiment of a voltage controller suitable for use in a second embodiment of an inverter arrangement provided by the invention, FIG. 8 is a block diagram illustrating a second embodiment of a voltage controller suitable for use in the second embodiment of an inverter arrangement provided by the invention, and FIG. 9 is a block diagram of the second embodiment of an inverter arrangement provided by the invention.

The basic idea on an inverter arrangement provided by the invention is that the control has been divided into two so that the torque control computes phase and main voltage references for a separate voltage controller, rather than the positions of the switches, the function of the voltage controller being to control the phase and main voltages of the machine to be equal to the voltage references given.

If one aims at phase-voltage-specific control, it is possible to use a PWM modulator provided with feedback and an LC low pass filter, like for example in UPS equipment. Such a PWM modulator is known for example from European Patent 439,642, and a block diagram illustrating it in detail is shown in FIG. 4.

In the voltage controller shown in FIG. 4, choke coils La, Lb and Lc are connected in series with switches SWa, SWb and SWc of the inverter AC. The capacitors Ca, Cb, Cc, which together with the choke coils form an LC low pass filter, form a star connection so that the star point T is connected to the lower potential 0V of a direct voltage intermediate circuit DC. Voltage feedback to the voltage controller is obtained from the phase voltages after the chokes. The feedback voltages $u_a$, $u_b$ and $u_c$ are supplied to a pulse width modulator PWM the operating frequency of which is determined by an oscillator circuit OC. The phase voltages supplied to an LC filter are pulses of the same order as the direct voltage $U_{DC}$ of the direct voltage intermediate circuit, and their frequency is determined by the oscillator circuit OC. By changing the pulse widths in the pulse width modulator, one can control the voltage of each phase such that it is the same as its reference value, i.e. $u_a=u_{aref}$, $u_b=u_{bref}$ and $u_c=u_{cref}$. The function of the filter is to filter the switching-frequency component from the phase voltages. The switching frequency should be notably higher than the resonance frequency of the LC filter, which in turn should be higher than the maximum frequency of the fundamental wave supplied to the machine. As a result of filtering, the voltage of a machine rotating at a standard rate is almost sinusoidal.

The use of a voltage controller of the type shown in FIG. 4 leads us to the flux and torque control principle illustrated in FIG. 5. Comparison with conventional DTC control illustrated in FIG. 1 shows that the stator voltage computation and switch reference selection blocks are lacking. A stator voltage computation block is no longer necessary, since one can rely on the voltage controller functioning sufficiently accurately, i.e. the actual voltage is always equal to its reference value. Consequently, it is possible to use the voltage reference directly as the input variable of the flux computation block VL instead of the measured voltage. The switch reference selection and sector computation blocks have been replaced by a control system in which phase-specific voltage references are computed on the basis of the error variables of the flux and torque. The error variables of the flux and torque are determined in the same way as in connection with the conventional control illustrated in FIG. 1, and so the blocks VL, IT, R, V1 and V2 associated with the computation of the error variables will not be described in greater detail herein.

The error variable $\Psi_{err}$ of the flux is an input variable for the flux controller FC, the output variable of the flux controller being a component $u_d$ that is parallel to the flux of the voltage reference. Correspondingly, the error variable $T_{err}$ of the torque is an input variable for the torque controller TC, the output variable of which is a voltage reference component $u_q$ that is perpendicular to the flux. The voltage components form a voltage reference vector, which can be expressed in a stator flux coordinate system as (cf. FIG. 3)

$$\bar{u}_{dq} = u_d + j u_q, \tag{1}$$

where $\bar{u}_{dq}$ = a stator voltage reference in a stator flux coordinate system.

Let the real and imaginary parts of a stator flux in a stator coordinate system be represented by $\Psi_x$ and $\Psi_y$, so that $$\bar{\Psi}_s = \Psi_x + j\Psi_y = \Psi_s e^{j\alpha}, \tag{2}$$

where $\Psi_s$ = the absolute value of a stator flux vector, and
$\alpha$ = the phase angle of a stator flux vector in a stator coordinate system.

A unit vector $e^{j\alpha}$ parallel to a stator flux is obtained by $$e^{j\alpha} = \frac{\bar{\Psi}_s}{\Psi_s} = \cos\alpha + j\sin\alpha, \tag{3}$$

where $$\cos\alpha = \frac{\Psi_x}{\sqrt{\Psi_x^2 + \Psi_y^2}} ja \tag{4}$$

$$\sin\alpha = \frac{\Psi_y}{\sqrt{\Psi_x^2 + \Psi_y^2}}. \tag{5}$$

The unit vector of equation 3 is computed in block YV of FIG. 5. The vector is supplied to a block CC that performs coordinate system conversion.

The voltage vector $\bar{u}_{dq}$ (equation 1) computed in the stator flux coordinate system is converted into a stator coordinate system in block CC by turning it by an angle $\alpha$, i.e. by multiplying it by a unit vector of equation 3:

$$\bar{u}_{sref} = e^{j\alpha} \bar{u}_{dq} = u_{xref} + j u_{yref}, \tag{6}$$

where $\bar{u}_{sref}$ = the stator voltage reference in a stator coordinate system, and $$u_{xref} = u_d \cos\alpha - u_q \sin\alpha ja \tag{7}$$

$$u_{yref} = u_d \sin\alpha + u_q \cos\alpha. \tag{8}$$

$\bar{u}_{sref}$ can be expressed by phase-specific voltage references as follows:

$$\bar{u}_{sref} = \frac{2}{3}\left(u_{aref} + u_{bref}e^{j\frac{2\pi}{3}} + u_{cref}e^{j\frac{4\pi}{3}}\right), \tag{9}$$

where
$u_{aref}$ = the voltage reference of phase a,
$u_{bref}$ = the voltage reference of phase b, and
$u_{cref}$ = the voltage reference of phase c.

From equations 6 and 9 it follows that $$u_{xref} = \frac{1}{3}(2u_{aref} - u_{bref} - u_{cref}) \tag{10}$$

$$u_{yref} = \frac{1}{\sqrt{3}}(u_{bref} - u_{cref}) \tag{11}$$

The average value (common-mode voltage) of the phase voltage references is indicated by $u_{ave}$, which is defined as follows:

$$u_{ave} = \frac{1}{3}(u_{aref} + u_{bref} + u_{cref}) \tag{12}$$

On the basis of equations 10, 11 and 12, the following terms are obtained for the phases-specific voltage references:

$$u_{aref} = u_{ave} + u_{xref} \tag{13}$$

$$u_{bref} = u_{ave} - \frac{1}{2}\left(u_{xref} - \sqrt{3}\, u_{yref}\right) \tag{14}$$

$$u_{cref} = u_{ave} - \frac{1}{2}\left(u_{xref} + \sqrt{3}\, u_{yref}\right) \tag{15}$$

The computation of the phase-specific voltage references is performed in block VOL, to which is also input common-mode voltage $u_{ave}$ as a reference value. In the present method, the phase voltage references are computed in the manner shown in equations 1 to 15. The voltage reference $u_d + j u_q$ (equation 1) of the stator flux coordinate system obtained as an output variable of the torque and flux controllers TC and FC and the unit vector $e^{j\alpha}$ (equations 3 to 5) parallel to the stator flux are thus input variables for the coordinate system conversion block CC (equations 6 to 8), which gives a voltage reference as an output variable in a stator coordinate system ($\bar{u}_{sref}$). On the basis of this voltage reference and the common-mode voltage reference $\bar{u}_{ave}$ given, phase-specific voltage references are finally formed in the phase voltage computation block VOL (equations 13 to 15), the voltage references being input variables for the voltage controller VC. In FIG. 5 voltage controller VC1 and the inverter AC of the inverter are presented as one block VAC. The voltage controller sees to it that the phase voltages supplied to the machine M are equal to the voltage references, so $\bar{u}_{sref}$ is also an input variable for the flux computation block, where it is interpreted as the actual value of the voltage.

Since the main voltage of the machine does not depend on the common-mode voltage $u_{ave}$, its magnitude has no effect on torque and flux control. The phase voltage references, however, depend directly on the value of $u_{ave}$ (equations 13, 14 and 15), so it should be selected such that the voltage references are maintained within the control area, which is 0 . . . +$U_{DC}$. If the voltage controller used is of the type shown in FIG. 4, $u_{ave}$ should be maintained at a constant value of about $U_{DC}/2$, so that variation in the common-mode voltage would not cause any extra parasitic current through the capacitors of the filter. It is not until the amplitude of the phase voltage grows greater than $U_{DC}/2$ that the voltage $u_{ave}$ should be varied in sync with the third harmonic of the fundamental wave, so that the DC voltage could be utilized to the full in the generation of the main voltage.

The block diagram of FIG. 5 shows that a new stator voltage reference is obtained from the torque controller, i.e. in practice from the coordinate system conversion block CC, in each torque controller computation period. The stator voltage reference thus changes step-wise. In practice, the step-wise change does not have any significance unless the operating frequency of the machine is particularly high (hundreds of hertzes) or the torque controller computation period is relatively long. In this kind of situation, in which the frequency of the machine is e.g. 200 Hz, the change of the stator voltage reference becomes so great in each instance of torque controller computation—unless a very effective, or rapid, and consequently expensive processor is used—that the voltage controller can no longer operate in the desired manner. It will then be necessary to supplement the phase voltage reference computation block VOL with a suitable interpolator, with which the step-wise change of the stator voltage reference can be turned into a linear change taking place during the torque controller computation period. To achieve this, the change between the old and the new stator voltage reference has to be divided with respect to the direction of the voltage reference into a change taking place at a constant angular rate during the computation period, and with respect to the change of amplitude, into a change taking place at a constant rate. The aim is to achieve soft and continuous change of a stator voltage reference instead of a step-wise change. If the above kind of linearization has to be applied in the computation of phase voltage references for a voltage controller, a similar procedure should also be applied to a stator voltage reference used in connection with flux computation, i.e. it is not considered to be valid until after a certain period of time. This should be done since the stator voltage value used in torque control should follow the actual stator voltage as closely as possible.

With regard to the basic idea of an inverter arrangement provided by the invention, the common-mode voltage $u_{ave}$ is insignificant, since the reference value $\bar{u}_{sref}$ of the stator voltage vector in the embodiment of FIG. 5 does not determine how high the common-mode voltage should be. The inverter arrangement according to the invention does thus not necessarily require phase-specific voltage control. It is sufficient that the main voltages are of the desired order.

When a phase voltage controller according to FIG. 4 is used, the main voltages can naturally be controlled as desired, but then the modulator cannot select switch positions as freely as in main voltage control. This results from the fact that in the phase voltage control there are three controllable variables. In the main voltage control there are only two such variables, since the stator voltage vector is determined by two main voltage vectors. A more optimal selection of switch positions would lead to a lower switching frequency and losses of switch components, so it would be justified to aim at directly controlling the main voltages.

A main voltage controller can be implemented e.g. in the manner shown in FIG. 7. It consists of a main voltage filter, which comprises serial chokes La, Lb and Lc and capacitors Cab, Cbc and Cac, comparators K1 and K2 for determining the main voltages from the phase voltages, and a modulator MOD, which generates control signals Sa, Sb and Sc to switches SWa, SWb and SWc of the inverter on the basis of the main voltages $u_{ac}$ and $u_{bc}$ and corresponding main voltage references $u_{acref}$ and $u_{bcref}$. Capacitors Cab, Cbc and Cac of the filter are connected between the phases, since the common-mode voltage will not be filtered. The voltage of two phases is measured differentially with respect to the third phase, so that two main voltages are obtained for feedback. In the connection illustrated in FIG. 7 by way of an example, voltages $u_{ac}$ and $u_{bc}$ between phases a and c on the one hand and b and c on the other hand are measured, the modulator MOD controlling the voltages to be equal to the main voltage references $u_{acref}$ and $u_{bcref}$ given.

The du/dt of the common-mode voltage is great when a controller of the type shown in FIG. 7 is used, and in practice it causes a major problem because of voltage peaks in the windings of the machine caused by voltage reflections. The voltage peaks burden the windings of the machine, so they may shorten the life of the machine. It would thus also be desirable to filter common-mode voltage, but it is not necessary to filter it as heavily as main voltage. In practice, it is sufficient that the du/dt is at most 500 V/µs.

Filtering of a common-mode voltage can be added to a main voltage controller of FIG. 7 by star-connecting filtering capacitors Ca, Cb and Cc in accordance with FIG. 8 and by connecting the star point T through capacitor $C_0$ to the lower potential of a DC voltage. A main voltage controller according to FIG. 8 is thus achieved, the controller having a different filter time constant for the main voltage and the common-mode voltage. The former is proportional to LC, which is selected on the basis of the switching frequency and the highest frequency of the fundamental wave. The latter is proportional to $LC_0$ ($C_0 \ll C$), which in turn is selected such that the desired du/dt of the common-mode voltage is achieved. The operating principle of the modulator M in respect of the main voltage control is the same as that of the modulator of FIG. 7.

The filter time constant of the common-mode voltage will grow, if $C_0$ is increased. The filtering is maximal when $C_0 \rightarrow \infty$. The capacitor concerned then corresponds to a short circuit, i.e. the LC filter changes to be similar as in FIG. 4. Normally, however, $C_0$ should be selected to be as small as possible, so that variation in the common-mode voltage would not cause a great parasitic current through $C_0$.

The main voltage references $u_{acref}$ and $u_{bcref}$ can be expressed by the phase voltage references as follows:

$$u_{acref} = u_{aref} - u_{cref} \tag{16}$$

$$u_{bcref} = u_{bref} - u_{cref} \tag{17}$$

The x and y components of the stator voltage reference (equations 10 and 11) can be expressed by the main voltage references as follows:

$$u_{xref} = \frac{2}{3}u_{acref} - \frac{1}{3}u_{bcref} \qquad (18)$$

$$u_{yref} = \frac{1}{\sqrt{3}}u_{bcref} \qquad (19)$$

On the basis of equations 18 and 19, the following terms are obtained for the main voltage references $u_{acref}$ and $u_{bcref}$:

$$u_{acref} = \frac{3}{2}u_{xref} + \frac{\sqrt{3}}{2}u_{yref} \qquad (20)$$

$$u_{bcref} = \sqrt{3}\,u_{yref} \qquad (21)$$

The reference value $\bar{u}_{sref}$ of the stator voltage vector is converted by equations 20 and 21 into main voltage references, whereby an inverter arrangement based on main voltage control according to FIG. 9 is achieved. The only difference between the inverter arrangement of FIG. 9 and that of FIG. 5 is that the phase voltage reference computation has been replaced with a main voltage reference computation block POL. In addition, a block containing the inverter and the main voltage controller is indicated in FIG. 9 by MAC. The main voltage references are input variables of a controller of the type shown in FIG. 7 or 8, the function of the controller being to control the corresponding main voltages to be equal to the references given.

In the computation of main voltage references, no common-mode voltage is needed, since the magnitude of the voltage is determined by the main voltage controller. The waveform of the common-mode voltage depends on the modulation principle and the strength of voltage filtering. The waveform does usually not follow a sine wave, so the phase voltages are not necessarily sinusoidal, either (with respect to a DC voltage). The main voltages, instead, are sinusoidal, since the LC time constant removes switching frequency variations from the main voltage almost completely.

What was stated in connection with the embodiment of FIG. 5 as regards possible linearization of a stator voltage reference generated by a torque controller before computation of phase voltage references for a voltage controller also applies to the embodiment of FIG. 9. The only difference is that it is the main voltage references rather than the phase voltage references that are now determined on the basis of the stator voltage reference. This, however, does not affect the possible need of linearizing the stator voltage reference.

In FIGS. 7, 8 and 9, the main voltages controlled are the main voltages between phases a and c, and b and c. Naturally, any two of the three main voltages of the machine can be controlled. Equations 20 and 21 should then be rewritten to correspond to the main voltages.

The notable advantage of the inverter arrangement provided by the invention is that the voltage supplied to the machine always corresponds to the value desired by the flux and torque controllers. The reason for this is that the stator voltage vector can be selected arbitrarily from the area restricted by a hexagon obtained by combining the voltage vectors $\bar{u}_1 \ldots \bar{u}_6$ of the 2-level inverter in the manner shown in FIG. 6. The instantaneous voltage supplied to the machine can always be controlled to be optimal so that with a constant load, the amplitude and phase angle of the voltage with respect to the flux are constant. From this it follows that when an inverter arrangement provided by the invention is used, the phase voltages are sinusoidal, if the machine rotates at a constant rate and load. In conventional DTC control, the phase voltages are always pulse-like, since only six voltage vectors and a zero vector are available. The sine-shape of the voltage supplied to the machine also brings about some advantages that cannot be achieved by DTC control as such. The advantages include elimination of problems that follow from electromagnetic incompatibility and a high increase rate of the phase voltage. Thus no voltage stress occurs in the windings of the machine, and there are no voltage reflections from the windings, and so the current measurements are not interfered with and the transmission of a current measurement signal is easy. Since a separate voltage controller is used, it is also possible to control the motor itself and to control the switches of the inverter independently, unlike in the conventional DTC control, and e.g. the switching frequency can now be selected independently of the motor control.

What is claimed is:

1. An inverter arrangement for simultaneous control of a stator flux and a torque of an electric machine (M) having a number of phases and a common mode voltage, comprising an inverter (AC) having switches (Swa, Swb, Swc) connected to a direct voltage intermediate circuit (DC) for generating an alternating voltage ($u_s$) having phase voltages corresponding to the number of phases of the electric machine (M), and a control system (CS) for controlling an instantaneous value of the alternating voltage ($u_s$) generated by the inverter (AC); the control system (CS) receiving, as input variables, reference values for the torque ($T_{ref}$) and the stator flux ($\psi_{ref}$) and measured values for the stator current ($i_s$) and stator voltage ($u_s$) and an average voltage ($u_{ave}$) of the common mode voltage of the stator voltage, including means (EC) for defining error variables for the torque ($T_{err}$) and the stator flux ($\psi_{err}$), said error variables being based on said input variables and which describe the difference between the reference values and actual values, and means for controlling the switches (Swa, Swb, Swc) of the inverter (AC) on the basis of the error variables, wherein the means for controlling the switches of the inverter includes:

means (FC, TC, CC) for generating a stator voltage reference ($u_{sref}$) based on the error variables ($T_{err}$, $\psi_{err}$) of the torque and stator flux;

means (VOL) for generating reference values on the basis of the stator voltage reference ($u_{sref}$) defined for phase voltages ($u_{aref}$, $u_{bref}$, $u_{cref}$) of the stator voltage and the average voltage ($u_{ave}$), and a feedback voltage controller (VC1) for controlling the phase voltages ($u_a$, $u_b$, $u_c$) of the stator voltage supplied to the electric machine (M) such that the phase voltages correspond to the reference values of the phase voltages.

2. An inverter arrangement according to claim 1 wherein the means for generating a stator voltage reference ($u_{sref}$) comprises a flux controller (FC) for generating, on the basis of the error variable ($\psi_{err}$) of the stator flux, a component ($u_d$) of the stator voltage reference ($u_{ref}$) parallel to the stator flux;

a torque controller (TC) for generating, on the basis of the error variable ($T_{err}$) of the torque, a component ($u_q$) of the stator voltage reference ($u_{sref}$) perpendicular to the stator flux; and means (CC) for performing coordinate system conversion for converting the stator voltage reference defined by components ($u_d$, $u_q$) in a stator flux coordinate system into a stator voltage reference in a stator coordinate system ($u_{sref}$).

3. An inverter arrangement according to claim 1 wherein the stator voltage reference ($u_{sref}$) forms one of the input variables to the means (EC) for defining the error variables for the torque ($T_{err}$) and the stator flux ($\psi_{err}$).

4. An inverter arrangement according to claim 1, wherein the switches have a selectable switching frequency and the feedback voltage controller (VC1) comprises a pulse with modulator (PWM) including an LC low pass filter (La, Lb, Lc, Ca, Cb, Cc) and voltage feedback, and an oscillator circuit (OC) for generating a control voltage for controlling the switching frequency of the switches (Swa, Swb, Swc) in the inverter (AC), the pulse width modulator (PWM) being arranged to receive the actual values of the phase voltages ($u_a$, $u_b$, $u_c$) of the stator voltage and the reference values ($u_{aref}$, $u_{bref}$, $u_{cref}$) as well as the control voltage generated by the oscillator circuit (OC), and to generate control signals ($S_a$, $S_b$, $S_c$) for the switches ($Sw_a$, $Sw_b$, $Sw_c$) of the inverter on the basis of these voltages.

5. An inverter arrangement for simultaneous control of a stator flux and a torque of an electric machine (M) having a number of phases, comprising an inverter (AC) having switches ($S_{wa}$, $S_{wb}$, $S_{wc}$) and connected to a direct voltage intermediate circuit (DC) for generating an alternating voltage ($u_s$) having a corresponding number of main phases ($U_a$, $U_b$, $U_c$) as the electric machine (M), and a control system (CS) for controlling an instantaneous value of the alternating voltage ($u_s$) generated by the inverter (AC); the control system (CS) receiving, as input variables, reference values for the torque ($T_{ref}$) and stator flux ($\psi_{ref}$) and measured values for the stator current ($i_s$) and stator voltage ($u_s$) and a stator voltage reference ($u_{sref}$), including means (EC) for defining error variables, for the torque ($T_{err}$) and the stator flux ($\psi_{err}$), said error variables being based on input variables and which describe a difference between the reference values and actual values, and means for controlling the switches (Swa, Swb, Swc) of the inverter (AC) on the basis of the error variables, wherein the means for controlling the switches of the inverter includes:

means (FC, TC, CC) for generating a stator voltage reference ($u_{sref}$) in response to the error variables ($T_{err}$, $\psi_{err}$) of the torque and stator flux, means (POL) for generating main voltage reference values ($U_{acref}$, $U_{bcref}$) in response to the stator voltage reference ($U_{sref}$), and a feedback voltage controller (VC2; VC3) for controlling the main voltages of the stator voltage supplied to the electric machine (M) such that said main voltages correspond to the defined reference values ($u_{acref}$, $u_{bcref}$) of the main voltages.

6. An inverter arrangement according to claim 5, wherein the feedback voltage controller (VC2) comprises an LC low pass filter including inductors (La, Lb, Lc) and capacitors (Cab, Cbc, Cac), said capacitors being connected between the phase voltages ($u_a$, $u_b$, $u_c$), means (K1, K2) for forming the actual values of the main voltages ($u_{ac}$, $u_{ab}$) from the phase voltages ($u_a$, $u_b$, $u_c$), and a modulator (MOD) arranged to receive the actual values of the main voltages ($u_{ac}$, $u_{bc}$) of the stator voltage and the reference values ($u_{acref}$, $u_{bcref}$) and to generate control signals ($s_a$, $s_b$, $s_c$) for the switches (Swa, Swb, Swc) of the inverter in accordance with of the voltages.

7. An inverter arrangement according to claim 5, wherein the intermediate current has a minus, and pole (OV) the feedback voltage controller (VC3) comprises;

an LC low pass filter including inductors (La, Lb, Lc) and capacitors (Ca, Cb, Cc), said capacitors being connected between the phases ($u_a$, $u_b$, $u_c$) and a common star point (T), and a capacitor ($C_0$) coupled to the star point and to the minus pole (OV) of the direct voltage intermediate circuit, means (K1, K2) for forming the actual values of the main voltages ($u_{ac}$, $u_{bc}$) from the phase voltages ($u_a$, $u_b$, $u_c$), and a modulator (MOD) for receiving the actual values of the main voltages (($u_a$, $u_{bc}$) of the stator voltage and the reference values ($u_{acref}$, $u_{bcref}$) and for generating control signals ($S_a$, $S_b$, $S_c$) for the switches (Swa, Swb, Swc) of the inverter on the basis of the voltages.

8. An inverter arrangement having at least one phase for connection to an intermediate circuit for simultaneous control of stator flux and torque values of an electric machine having a corresponding number of phases comprising:

an inverter having switches for generating an alternating voltage having a number of phases corresponding to the phases of the electric machine;

a control system for controlling an instantaneous value of the alternating voltage generated by the inverter, the control system receiving, as input variables, reference values corresponding to the torque and to the stator flux and measured values corresponding to stator current and to stator voltage including means for defining error variables for the torque and the stator flux based on the input variables and which describe the difference between the reference values and the measured values, and means for controlling the switches of the inverter on the basis of the error variables, means for controlling the switches of the inverter including:

means for generating a stator voltage reference based on the error variables of the torque and stator flux;

means for generating reference values on the basis of the stator voltage reference defined for phase voltages of the stator voltage and the reference value for a common-mode voltage of the stator voltage, and a feedback voltage controller for controlling the phase voltages of the stator voltage supplied to the electric machine such that said phase voltages correspond to the defined reference values of the phase voltages.

9. An inverter arrangement having at least one phase for connection to a direct voltage intermediate circuit for simultaneous control of stator flux and torque values of an electric machine having a corresponding number of phases, comprising:

an inverter connected to a direct voltage intermediate circuit including inverter control switches for generating an alternating voltage that has a corresponding number of phases as the electric machine, and a control system for controlling an instantaneous value of the alternating voltage generated by the inverter, the control system receiving, as input variables, reference values corresponding to the torque and to the stator flux and measured values corresponding to stator current ($i_s$) and to stator voltage including means for defining error variables for the torque and the stator flux based on the input variables for describing the difference between the reference values and the measured values, and means for controlling the inverter control switches in accordance with the error variables, including means for generating a stator voltage reference in accordance with the error variables of the torque and stator flux values, means for generating reference values in accordance with the stator voltage reference, defined for voltages of the strator voltage, and a feedback voltage controller for controlling the voltages of the stator voltage supplied to the electric machine corresponding to the defined reference values of the voltages.

* * * * *